(12) United States Patent
Knoke et al.

(10) Patent No.: US 9,859,713 B2
(45) Date of Patent: Jan. 2, 2018

(54) PARALLEL INVERTERS CONNECTED TO ONE INDUCTOR

(71) Applicant: SMA Solar Technology AG, Niestetal (DE)

(72) Inventors: Raphael Knoke, Paderborn (DE); Henning Schneider, Schotten (DE); Gerold Schulze, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 421 days.

(21) Appl. No.: 14/575,025

(22) Filed: Dec. 18, 2014

(65) Prior Publication Data

US 2015/0102678 A1    Apr. 16, 2015

Related U.S. Application Data

(63) Continuation of application No. PCT/EP2013/062497, filed on Jun. 17, 2013.

(30) Foreign Application Priority Data

Jun. 26, 2012   (DE) .................... 10 2012 105 583

(51) Int. Cl.
| | |
|---|---|
| *H01F 27/29* | (2006.01) |
| *H02J 3/38* | (2006.01) |
| *H02M 7/797* | (2006.01) |
| *H01F 27/24* | (2006.01) |
| *H01F 27/28* | (2006.01) |

(52) U.S. Cl.
CPC .............. *H02J 3/38* (2013.01); *H01F 27/24* (2013.01); *H01F 27/28* (2013.01); *H01F 27/29* (2013.01); *H02M 7/797* (2013.01); *Y10T 307/713* (2015.04)

(58) Field of Classification Search
CPC ........... H02M 7/797; H02J 3/38; H01F 27/24; H01F 27/28; H01F 27/29
See application file for complete search history.

(56) References Cited

U.S. PATENT DOCUMENTS

| | | | |
|---|---|---|---|
| 8,730,686 B2* | 5/2014 | Feng ................... | H01F 30/14 336/170 |
| 2008/0186749 A1 | 8/2008 | Blanchery | |
| 2009/0231891 A1* | 9/2009 | Laitinen ............... | H01F 7/0205 363/44 |
| 2010/0165678 A1 | 7/2010 | Costan et al. | |
| 2012/0002450 A1 | 1/2012 | Mueller | |

OTHER PUBLICATIONS

International Search Report dated Aug. 8, 2013 for International Application No. PCT/EP2013/062497.

* cited by examiner

*Primary Examiner* — Patrick O'Neill
(74) *Attorney, Agent, or Firm* — Eschweiler & Potashnik, LLC

(57) ABSTRACT

An inductor device has a plurality of inductor windings arranged on a common magnetic core and electrically connected, parallel to one another, to a common connection at one end of the inductor windings. The inductor windings are implemented by a one-part coil form arranged on the common magnetic core and comprising the common connection of the inductor windings. The inductor windings are wound around their common connection and the common magnetic core.

13 Claims, 3 Drawing Sheets

PARALLEL INVERTERS CONNECTED TO ONE INDUCTOR

REFERENCE TO RELATED APPLICATIONS

This application is a continuation of International Application number PCT/EP2013/062497, filed on Jun. 17, 2013, which claims priority to German Application number 10 2012 105 583.1, filed on Jun. 26, 2012.

FIELD

The disclosure relates to an inductor device and an apparatus comprising an inductor device with which electric current can be fed from at least one DC source into an AC grid via a plurality of inverters.

BACKGROUND

DE 41 11 734 C1 discloses a method in which a plurality of inverters are connected in parallel in order to feed current from at least one DC source into an AC grid. In this case, the inverters have one output for each phase of the AC grid, wherein the outputs of different inverters which belong to one phase of the alternating current are connected to a phase connection for the corresponding phase of the alternating current via decoupling inductors. In order to minimize a transverse current which may occur between the inverters if said inverters have a different switching response, a potential control command to one of two inverter strings between which a transverse current occurs is temporarily reversed. For this purpose, the currents flowing from the two inverter strings are compared using a comparator, by means of which the reversal of the potential control command is triggered when a limit value is exceeded. This reversal is only canceled again when the transverse current has fallen below the limit value again.

It is conventional to provide a line filter inductor between a common phase connection, to which a plurality of inverters are connected via decoupling inductors, and the associated phase of an AC grid.

US 2010/0165678 A1 discloses an arrangement for converting a direct current into a polyphase alternating current, wherein the arrangement has a plurality of inverters. Each of the inverters has one output for each of the phases of the alternating current, wherein the outputs of the inverters which are assigned to the same phases are each connected to a phase connection. In order to suppress transverse currents between the inverters, a first inductor comprising an inductor winding on a magnetic core is provided between each output and an intermediate point. A second inductor comprising an inductor winding on the same magnetic core as an inductor winding of a first inductor of another inverter assigned to the same phase is provided between this intermediate point and the associated phase connection. The cores on which the inductor windings of the first inductors, assigned to the different phases, of each inverter are arranged are magnetically coupled to one another, i.e. parallel limbs of an EE core.

DE 10 2007 063 434 A1 discloses an inverter system comprising a plurality of inverters electrically connected in parallel, i.e. the inverters having one output for each phase of an alternating current output to a load. An inductive coupling unit is provided for these outputs, in which the currents of one phase of all of the inverters are coupled by an inductor. I.e., the inductors of the inverters assigned to the same phase are arranged on a common magnetic core. The coupling unit acts as a differential mode inductor and thus only damps circulating currents. Specifically, the inductors which are assigned to the outputs of the inverters for the same phase are arranged on parallel limbs of in each case one core.

EP 2 237 404 A1 discloses an inverter apparatus comprising two full-bridge circuits connected in parallel. A filter inductor for the output alternating current is arranged in the two output lines of each full-bridge circuit. In this case, the filter inductors are magnetically coupled to form a double inductor in those two lines of the two full-bridge circuits which lead to the same output of the apparatus. The double inductor comprises two windings on a common core, wherein one winding end is connected to an AC output of the apparatus directly or via further filter elements, while the other winding end is connected to one of the outputs of the two full-bridge circuits.

DE 293 758 A discloses a device for compensating for no-load current in the case of coils with an iron core. In this case, a plurality of metal strips which are insulated from one another are laid around a coil core such that in total they represent a coil with a high inherent capacitance. The metal strips are wound around the coil core in addition to a primary and secondary winding. The inner end of each metal strip is connected to the outer end of the adjacent metal strip by a Z-shaped conductor, with the result that the metal strips are connected in series. The outer end of the first metal strip and the inner end of the last metal strip, however, remain open.

There still is a need of an inductor device which is optimized in terms of its manufacturing complexity and an apparatus having such an inductor device which is thus optimized, and by means of which electric current can be fed from at least one DC source into an AC grid via a plurality of inverters.

SUMMARY

The present disclosure provides an inductor device comprising a first common magnetic core; and a plurality of first inductor windings arranged on the first common magnetic core and electrically connected, parallel to one another, to a first common connection at one end of the first inductor windings. The first inductor windings are implemented by a first one-part coil form arranged on the first common magnetic core and comprising the first common connection of the first inductor windings. The first inductor windings are wound around their first common connection and the first common magnetic core.

The present disclosure further provides an apparatus for feeding electric current from at least one DC source into an AC grid. The apparatus comprises a plurality of inverters electrically connected in parallel; and one phase connection for each phase of the AC grid. Each of the inverters comprises an output for each phase of the AC grid, the output being electrically connected to the phase connection for the same phase via an inductor including an inductor winding. All of the inductor windings of those inductors via which the outputs of the inverters for the same phase are electrically connected to the phase connection for this phase are inductor windings of one inductor device. The inductor device further comprises a common magnetic core, the inductor windings and the phase connection being implemented by a one-part coil form arranged on the first common magnetic core, and the inductor windings being wound around the phase connection and the common magnetic core.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The present disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
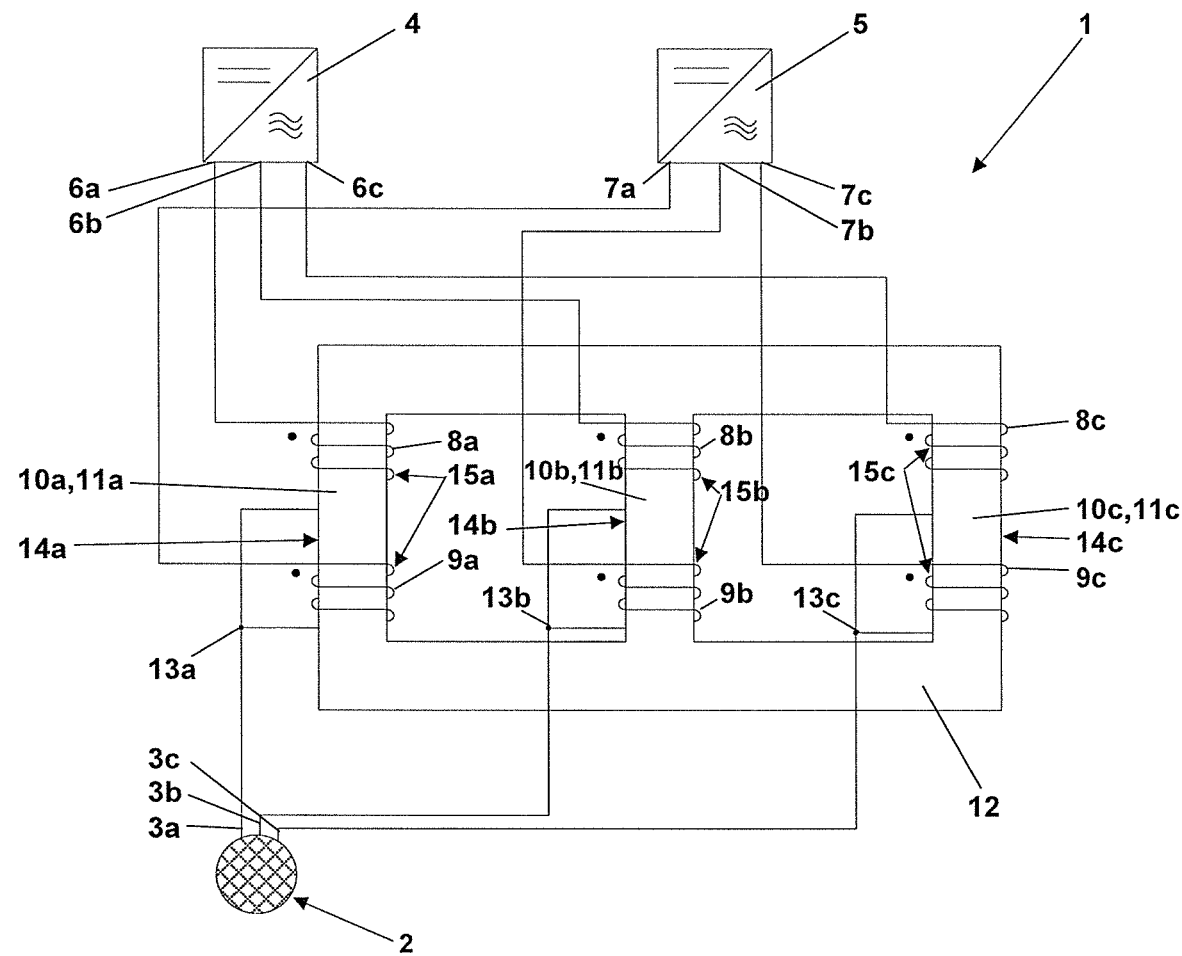
FIG. 1 is a schematic illustration of an apparatus according to the disclosure with which electric current can be fed from at least one DC source into an AC grid via a plurality of inverters.

This disclosure relates to an inductor device comprising a plurality of inductor windings, which are arranged on a common magnetic core and which are connected, parallel to one another, to a common connection at one end of the inductor windings in an electrically conductive way. The inductor windings are implemented by a one-part coil form arranged on the common magnetic core and including the common connection of the inductor windings, wherein the inductor windings are wound around their common connection and the common magnetic core.

When the claims to the inductor device refer to first, second or third inductor windings, common magnetic cores or common connections, this does not mean that there is any order of priority, but only serves for distinguishing between the parts designated in this way.

Furthermore, the disclosure relates to an apparatus comprising an inductor device according to the disclosure by which electric current is feedable from at least one DC source into an AC grid. The apparatus according to the disclosure comprises a plurality of inverters electrically connected in parallel and a phase connection for each phase of the AC grid. Each of the inverters comprises one output for each phase of the AC grid, which output is connected to the phase connection for the same phase via an inductor having an inductor winding in an electrically conductive way. All of the inductor windings of the inductors via which the outputs of the inverters for the same phase are connected to the phase connection for this phase are arranged on a common magnetic core.

In case of high direct currents or direct currents of different magnitudes which are to be fed from the at least one DC source into the AC grid, it is possible to use, instead of only one inverter, a plurality of inverters, which are electrically connected in parallel and which may individually be switched off, to convert the direct current into an alternating current in order to feed said alternating current into the AC grid. In this case, each inverter has one output for each phase of the AC grid, and the outputs of the various inverters assigned to the same phase of the AC grid are electrically connected to a phase connection via inductors.

The DC source may be, for example, a photovoltaic generator, whose direct current is converted into a three-phase alternating current by the inverters electrically connected in parallel. Corresponding to the three phases, the apparatus then comprises three phase connections.

By arranging the inductor windings of the inductors of those inverters which are assigned to the outputs for the same phase on a common magnetic core, there is an electrical connection between these outputs, but there is also electrical decoupling achieved by means of magnetic coupling of the inductors. The electrical decoupling minimizes the formation of transverse currents between the outputs of different inverters. When a voltage difference is present between two outputs of two inverters assigned to the same phase connection, which may, for example, result from different switching responses of the inverters, the magnetic coupling of the associated inductors results in both their inductances and their mutual inductances counteracting the transverse current resulting from the voltage difference. As a result, it is possible to counter-act a transverse current between two inverters with inductors with smaller dimensions, i.e. inductors with a lower inductance between the inverters and a correspondingly smaller physical size, as compared to no magnetic coupling and therefore no additional effect of the inductors owing to their mutual inductances being present.

In an embodiment of the apparatus according to the disclosure, the inductors which are assigned to the outputs for the same phase and whose inductor windings are arranged on the common magnetic core at the same time implement a line filter inductor for the associated phase connection. In addition to this line filter inductor, an additional line filter inductor may be assigned to each phase connection. In a particularly compact embodiment of the apparatus, the phase connections do, however, not have such additional line filter inductors.

The inductor windings which are assigned to the outputs for the same phase and are correspondingly arranged on a common magnetic core are implemented by a one-part coil form which additionally comprises the common connection via which the inductor windings are connected to the associated phase connection.

For this purpose, the coil form may be formed from separate metal strips for the individual inductor windings and the common connection, which separate metal strips are connected so as to form the one-part coil form. For example, the metal strips for the inductor windings may first be arranged spaced apart from one another and parallel to one another and transversely to another metal strip for the common connection, and then be connected with the common connection in an electrically conductive way, before they are wound to form the coil form. The connection may in this case be configured as desired. For example, the metal strips for the inductor windings may be welded or crimped to the metal strip of the common connection. In order to prevent electrical contact and therefore a short circuit occurring between different inductor windings and/or within an inductor winding, the metal strips may additionally be coated with an insulating material, wherein only connection regions for connecting the individual inductor windings to the outputs of the inverters and for connecting the common connection to the phase connection may remain uncoated in order to produce an electrical contact.

In a specific embodiment of the apparatus according to the disclosure, the coil form for the inductors at the outputs of the inverters which are assigned to the same phase is formed as a slotted metal sheet, wherein the slots extend from one end of the metal sheet up to shortly before the other end thereof, with the result that, starting from one end of the metal sheet, separate metal strips for the inductor windings are formed, but said inductor windings remain connected at the other end by a transversely extending metal strip implementing the common connection. The slots may be introduced into the metal sheet in virtually any desired manner, for example they may be cut or punched into the metal sheet. Due to the slots the metal sheet has a comb-like profile or a profile comprising a series of rectangles. Even with the coil form being formed as a slotted metal sheet, the metal strips for the inductor windings, in one embodiment, are electrically insulated from one another.

The inductor windings of the coil form for the inductors at the outputs of the inverters which are assigned to the same phase are wound in such a way that the common connection of the inductor windings is on the inside at the core. The outer connections for connecting the inductor windings to the outputs of the individual inverters are particularly easily accessible; and even the inner common connection may be contacted easily in that it is passed out axially, i.e. parallel to the core.

Typically, the individual inductor windings are wound in the shape of a spiral around the common core, with the result that they are arranged in planes extending parallel to one another, which are each oriented normal to the direction of main extension of the core and which are spaced apart from one another. Thus, the inductor windings are physically separated and may therefore be easily insulated from one another up to their common connection.

The magnetic cores on which the inductors assigned to the same phase connection are arranged may be separated. In an embodiment, however, they are magnetically coupled. For example, the magnetic cores may be parallel limbs of a magnetic basic body.

The conversion of the direct current provided by the DC source into an alternating current may in principle take place in any desired manner, and the inverters may in principle have any desired configuration for this purpose. For example, the current shaping of the alternating current may be based on pulse width modulation. Clocking of the inverters may in this case take place for each inverter independently of the others. In one embodiment of the apparatus according to the disclosure, the inverters, i.e. switches of their inverter bridges, are clocked synchronously as, in this case, the transverse currents to be damped are only caused by different switching characteristics of the inverters, but not by different clocking and resultant clock-phase shifts. The transverse currents still to be damped afterwards are thus effectively limited. For this purpose, the apparatus according to the disclosure may have a separate control device, which actuates switches of the inverter bridges of the inverters synchronously or synchronizes controls of the individual inverters.

In particular, the apparatus according to the disclosure may be provided for feeding electric current from at least one DC source into a three-phase AC grid. The DC source may in particular be a photovoltaic generator.

Now referring in greater detail to the drawings, FIG. 1 shows an apparatus 1 according to the disclosure with which electric current may be fed from at least one DC source (not illustrated here) into an AC grid 2. In this case, the apparatus 1 has a phase connection 3$a$, 3$b$, 3$c$ for each phase of the three-phase AC grid 2.

In the embodiment illustrated in FIG. 1, the apparatus 1 according to the disclosure has two inverters 4, 5 electrically connected in parallel, wherein each of the inverters 4, 5 is connected on the input side to the current source(s) and have an output 6$a$, 6$b$, 6$c$, 7$a$, 7$b$, 7$c$ for each phase of the three-phase AC grid 2. Each output 6$a$-6$c$, 7$a$-7$c$ is electrically conductively connected to one of the three phase connections 3$a$-3$c$ via an inductor having an inductor winding 8$a$-8$c$, 9$a$-9$c$. In this case, the inductor windings 8$a$ and 9$a$, 8$b$ and 9$b$ and 8$c$ and 9$c$, via which the outputs 6$a$ and 7$a$, 6$b$ and 7$b$ and 6$c$ and 7$c$, respectively, are connected to the same phase connection 3$a$, 3$b$ and 3$c$, respectively, are each arranged as coil form 15$a$, 15$b$ and 15$c$, respectively, on a common magnetic core 10$a$, 10$b$ and 10$c$, respectively.

In the embodiment illustrated in FIG. 1, the magnetic cores 10$a$, 10$b$ and 10$c$ are limbs 11$a$, 11$b$, 11$c$ of a integral magnetic basic body, which has the same shape of a three-phase transformer 12. The three inductor windings 8$a$ and 9$a$, 8$b$ and 9$b$ and 8$c$ and 9$c$, which are each arranged on a common magnetic core 10$a$, 10$b$, 10$c$, have a common connection 13$a$, 13$b$ and 13$c$, respectively, which is electrically conductively connected to one of the phase connections 3$a$, 3$b$, 3$c$. The inductor windings 8$a$-8$c$, 9$a$-9$c$ are in this case all wound around their magnetic core 10$a$-10$c$ in the same direction.

In that the inductor windings 8$a$ and 9$a$, 8$b$ and 9$b$ and 8$c$ and 9$c$, which are assigned to the outputs 6$a$ and 7$a$, 6$b$ and 7$b$ and 6$c$ and 7$c$, respectively, are each arranged on a common magnetic core 10$a$-10$c$, they are magnetically coupled. By means of this arrangement, transverse currents occurring between the outputs 6$a$-6$c$, 7$a$-7$c$, which result, for example, from nonidentical switching responses of the inverters 4, 5, may be minimized such that the outputs 6$a$ and 7$a$, 6$b$ and 7$b$ and 6$c$ and 7$c$ of the inverters 4, 5 are de-coupled.

If, for example, the output 6$a$ of the inverter 4, due to a nonidentical switching response, is at a higher potential than the output 7$a$ of the inverter 5 for the same phase of the AC grid 2, this could in principle result in a transverse current between the output 6$a$ of the inverter 4 and the output 7$a$ of the inverter 5. Since the associated inductors 8$a$, 9$a$ are arranged on the same magnetic core 10$a$, however, both the inductances of the inductor windings 8$a$, 9$a$ and the mutual inductances of the magnetically coupled inductor windings 8$a$, 9$a$ counteract such a transverse current.

The inductor windings 8$a$ and 9$a$, 8$b$ and 9$b$ and 8$c$ and 9$c$ wound onto a common magnetic core 10$a$, 10$b$ and 10$c$, respectively, act simultaneously as line filter inductors 14$a$, 14$b$, 14$c$ of the phase connections 3$a$, 3$b$, 3$c$ in the embodiment of the apparatus 1 according to the disclosure illustrated in FIG. 1. By virtue of these line filter inductors 14$a$-14$c$, the current output at the outputs 6$a$-6$c$, 7$a$-7$c$ of the inverters 4, 5 may be filtered in order to suppress a switching ripple arising from pulse width modulation used for current shaping in the respective inverter.

Figure 2:
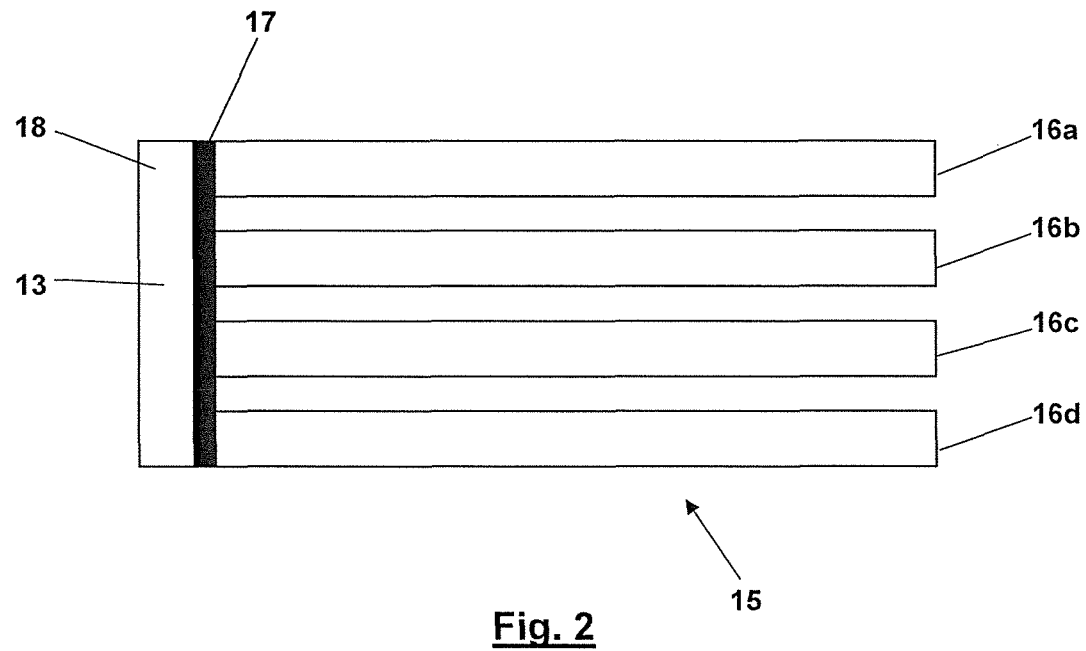
FIG. 2 shows an unwound one-part coil form from which a plurality of inductor windings arranged on a common core of an apparatus according to the disclosure may be formed.

FIG. 2 illustrates an unwound coil form 15, from which the inductor windings of the inductors of an apparatus 1 according to the disclosure may be formed. In the embodiment of the coil form 15 illustrated in FIG. 2, said coil form is intended for forming four inductor windings, i.e. for a parallel circuit of four inverters. For this purpose, the coil form 15 has four metal strips 16$a$-16$d$, which are wound on in the shape of a spiral so as to implement the inductor windings for the inductors. The metal strips 16$a$-16$d$ which are spaced apart from one another and extend parallel to one another are electrically conductively connected to a further metal strip 18 extending transversely thereto via a connection 17 which implements the common connection 13 for the inductors formed from the metal strips 16a-16d and via which said inductors are connected jointly to a phase connection 3 shown in FIG. 1.

The inductor windings 8, 9 for the inductors are formed by the coil form 15 illustrated in FIG. 2 in such a way that the metal strips 16a-16d are wound beginning with the metal strip 18, with the result that the metal strip 18, which forms the common connection 13, is within the coil form. As a result, connecting the outputs of the inverters to the individual inductor windings is possible in a particularly simple manner. The rolling-up of the windings may take place in such a way that the metal strips 16a-16d are wound onto a magnetic core. The coil form 15 may also be pushed onto a magnetic core only after the metal strips 16a-16d have been wound to form inductor windings.

In order to electrically insulate the inductor windings formed from the metal strips 16a-16d from one another, the metal strips 16a-16d may be coated with an electrically insulating material.

Figure 3:
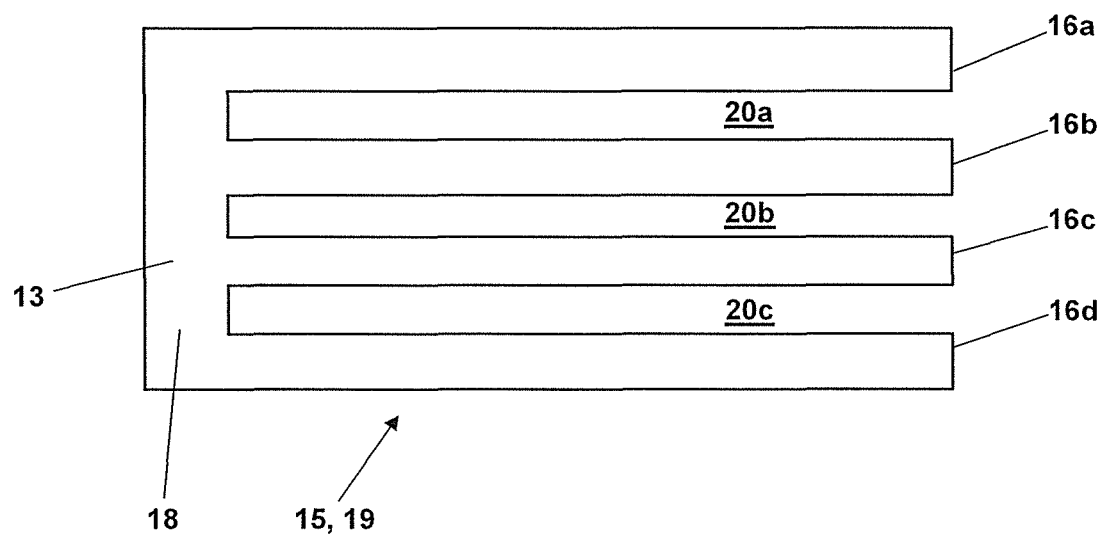
FIG. 3 shows an unwound one-part coil form from which a plurality of inductor windings arranged on a common core of an apparatus according to the disclosure may be formed, in a further embodiment.

FIG. 3 illustrates a further embodiment of the coil form 15, in the unwound state in this case, too. This coil form 15 is formed from a slotted metal sheet 19, wherein the separate metal strips 16a-16d lying next to one another are formed by the slots 20a-20c introduced into the metal sheet 19, and wherein the metal strips 16a-16d are connected at one end of the metal sheet 19 by virtue of the slots 20a-20c only being passed up to shortly before this end, which thus forms the common connection 13 for the inductor windings formed from the metal strips 16a-16d. Otherwise, the embodiment of the coil form 15 shown in FIG. 3 corresponds to that shown in FIG. 2, in particular in respect of the possibilities for the formation of the inductor windings.

Figure 4:
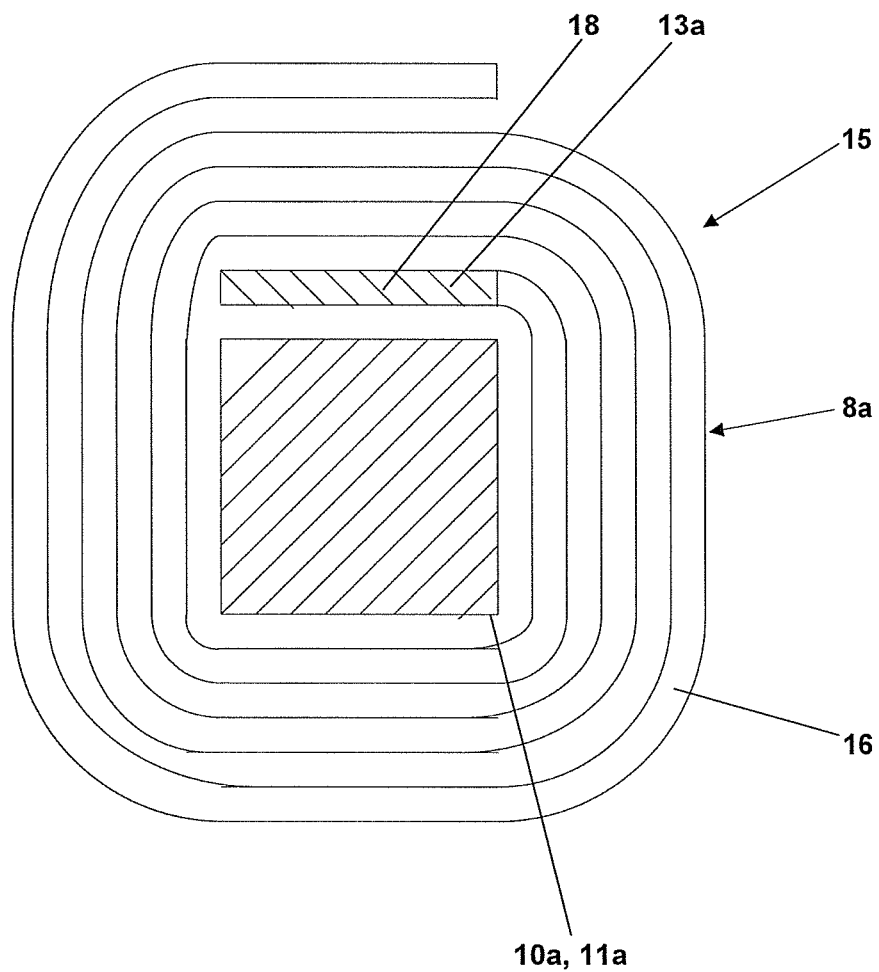
FIG. 4 shows a section through the one-part coil form according to FIG. 3 wound onto a core with a viewing direction onto one of the inductor windings formed thereby.

FIG. 4 shows a wound coil form 15, whereby the slotted metal sheet 19 with the metal strips 16a-16d extending parallel to one another as shown in FIG. 3 being wound onto the magnetic core 10 so as to implement an inductor device according to the disclosure. The inductor winding 8a which can be seen in plan view in the section shown in FIG. 4 is in this case wound in the shape of a spiral around the core 10 and the common connection 13 implemented by the metal strip 18. Electrical contact with the inductor windings arranged on the common core 10 at their inner ends is possible without any problems via the common inner connection 13. The outer ends of said inductor windings are connectable to the outputs of the inverters, which are each assigned to the same phase connection, without impeding one another.

Many variations and modifications may be made to the various embodiments of this disclosure without departing substantially from the spirit and principles of this disclosure. All such modifications and variations are intended to be included herein within the scope of the present disclosure, as defined by the following claims.

The invention claimed is:

1. An inductor device, comprising:
a first common magnetic core; and
a plurality of first inductor windings arranged on the first common magnetic core and electrically connected, parallel to one another, to a first common connection at one end of the first inductor windings;
wherein the first inductor windings are implemented by a first one-part coil form arranged on the first common magnetic core and comprising the first common connection of the first inductor windings, the first inductor windings being wound around their first common connection and the first common magnetic core.

2. The inductor device of claim 1, further comprising:
a second common magnetic core; and
a plurality of second inductor windings arranged on the second common magnetic core and electrically connected, parallel to one another, to a second common connection at one end of the second inductor windings,
wherein the second inductor windings are implemented by a second one-part coil form arranged on the second common magnetic core and comprising the second common connection of the second inductor windings, the second inductor windings being wound around their second common connection and the second common magnetic core.

3. The inductor device of claim 2, further comprising:
a third common magnetic core; and
a plurality of third inductor windings arranged on the third common magnetic core and electrically connected, parallel to one another, to a third common connection at one end of the third inductor windings,
wherein the third inductor windings are implemented by a one-part coil form arranged on the third common magnetic core and comprising the third common connection of the third inductor windings, the third inductor windings being wound around their third common connection and the third common magnetic core.

4. The inductor device of claim 3, wherein the first, second and third magnetic cores are magnetically coupled to one another.

5. The inductor device of claim 4, wherein the first, second and third magnetic cores are parallel limbs of a common magnetic basic body.

6. The inductor device of claim 1, wherein the coil form comprises:
metal strips running parallel to one another and implementing the inductor windings; and
a metal strip running transversely to the parallel metal strips and implementing the common connection.

7. The inductor device of claim 6, wherein the coil form comprises a slotted metal sheet.

8. The inductor device of claim 1, wherein the inductor windings are each wound around the magnetic core in a spiral shape.

9. An apparatus for feeding electric current from at least one DC source into an AC grid, the apparatus comprising:
a plurality of inverters electrically connected in parallel; and
one phase connection for each phase of the AC grid;
wherein each of the inverters comprises an output for each phase of the AC grid, each inverter output being electrically connected respectively to the phase connection for the same phase via an inductor including an inductor winding;
wherein all of the inductor windings of those inductors via which the outputs of the inverters for the same phase are electrically connected to the phase connection for a particular phase are inductor windings of one inductor device,
the inductor device further comprising a common magnetic core,
the inductor windings and a common connection at one end of the inductor windings, the common connection being connected to the phase connection for the particular phase, being implemented by a one-part coil form arranged on a portion of the common magnetic core, and the inductor windings being wound around the common connection and the portion of the common magnetic core.

10. The apparatus of claim 9, wherein the inductor windings of the inductors arranged on the common magnetic core and electrically connecting the outputs of the inverters for the same phase to the phase connection for this phase form a line filter inductor for the phase connection for this phase.

11. The apparatus of claim 9, wherein the AC grid comprises three phases.

12. The apparatus of claim 9, wherein the inverters are configured to be clocked synchronously.

13. An inductor system for deployment in an inverter system connection to a multi-phase power grid, comprising:

a common magnetic core having three limbs associated therewith that each form part of the common magnetic core, the three limbs corresponding to three phases of the multi-phase power grid; and N windings wound about each of the three limbs, wherein N is an integer of two or more and corresponds to a number of inverters that interface with the inductor system, wherein each of the N windings of each limb have a first terminal that are configured to couple to a respective phase output of one of the N inverters, and wherein each of the N windings of each limb have a second terminal connected together and are configured to couple to a one of the phases of the power grid, and wherein the connected together second terminals of the N windings of each limb are located at the magnetic core and enclosed by the N windings of the respective limb.

* * * * *